United States Patent [19]

Crask et al.

[11] 4,037,139
[45] July 19, 1977

[54] LIGHTNING ARRESTER

[75] Inventors: Roy I. Crask, Edina; William D. Egerer, Minneapolis, both of Minn.

[73] Assignee: Buckbee-Mears Company, St. Paul, Minn.

[21] Appl. No.: 558,670

[22] Filed: Mar. 17, 1975

[51] Int. Cl.² .............................................. H02H 3/22
[52] U.S. Cl. ........................................ 361/58; 315/262; 361/120; 361/136
[58] Field of Search .................... 317/62, 69, 70, 76, 317/12 A, 12 B, 12 R, 16, 31; 315/262

[56] References Cited

U.S. PATENT DOCUMENTS

| 978,959 | 12/1910 | Thomas | 317/62 |
|---|---|---|---|
| 1,494,334 | 5/1924 | Beattie | 317/76 |
| 1,656,956 | 1/1928 | Schröter | 317/31 X |
| 2,967,256 | 1/1961 | Rees | 317/62 X |
| 3,210,648 | 10/1965 | Lockie | 317/15 X |

FOREIGN PATENT DOCUMENTS

| 1,065,530 | 5/1954 | France | 317/12 A |
|---|---|---|---|
| 681,392 | 8/1939 | Germany | 317/16 |
| 1,058,617 | 6/1959 | Germany | 317/31 |

*Primary Examiner*—Harry E. Moose, Jr.

[57] ABSTRACT

A step-up transformer is connected to a reference potential level and is coupled to a multiple-electrode gas-filled discharge tube to provide a pulse of sufficient magnitude to fire the tube and thereby protect a signal line and the equipment to which it is connected against voltage surges which may be harmful but which are otherwise too low to ignite the tube.

10 Claims, 2 Drawing Figures

LIGHTNING ARRESTER

BACKGROUND OF THE INVENTION

1. Field of the Invention

This invention is directed for use in the field of lightning arrestors or protectors for protecting electrical signal lines against voltage surges which may occur on the line and which could be harmful to equipment or personnel.

2. Description of the Prior Art

An article titled "New Gas Tube Protector Technique for Circuits" by C. Bruce Barksdale appearing in TELEPHONY on Oct. 17, 1970, describes in some detail the more commonly used means of protecting electrical lines against induced lightning surges. Briefly, this article described the use of a gas-filled discharge tube containing three electrodes with one of the electrodes grounded and the other two electrodes connected to signal lines, such as a two-wire telephone line. Types of suitable gas-filled discharge tubes and their manner of construction and operation are described in U.S. Pat. Nos. 3,522,570 and 3,535,779 by Wanaselja. A high magnitude pulse, such as that induced in a telephone line by nearby lightning, if of a magnitude that equals the ignition or firing threshold of a gas tube, will cause the tube to conduct thereby providing a path to ground for both lines thus preventing this high surge from reaching the equipment being fed by the signal lines, such as a telephone receiver and transmitter. Both lines are grounded through the tube because all of the electrodes are contained in a single cavity and once the gas in the cavity ignites it brings all of the electrodes to the same low potential level. A major drawback of the multiple-electrode gas-filled discharge tube is its relatively high igniting potential which is ordinarily in the range of at least 200 volts and more often is in the range of 300 to 500 volts. While this range may be suitable for protection against harm to heavy equipment and may even possibly protect against harm to life, voltage surges of a lesser magnitude which are not arrested can still harm other present day equipment, especially equipment containing low voltage devices such as transistors and other semiconductor devices. Also, there is still the potential danger of injury to personnel from voltage surges which have a magnitude less than the ignition or firing potential levels.

U.S. Pat. No. 3,816,802 issued to the instant applicants describes gas-filled discharge tubes combined with step-up transformers for protecting signal lines, but the invention described therein has been found to be inoperable. The instant invention is a modification of this earlier circuit.

SUMMARY OF THE INVENTION

In a multiple-electrode gas-filled discharge tube used as a signal line protector in which one electrode is connected to ground, for each electrode that is connected to the electrical line being protected there is provided another electrode with the latter two electrodes coupled together by a step-up transformer which is connected to a reference potential level to produce a potential which will ingnite the gas tube even though the magnitude of the pulse appearing on the signal line would not be sufficient to cause ignition.

BRIED DESCRIPTION OF THE DRAWING

DESCRIPTION OF THE PREFERRED EMBODIMENTS

Figure 1:
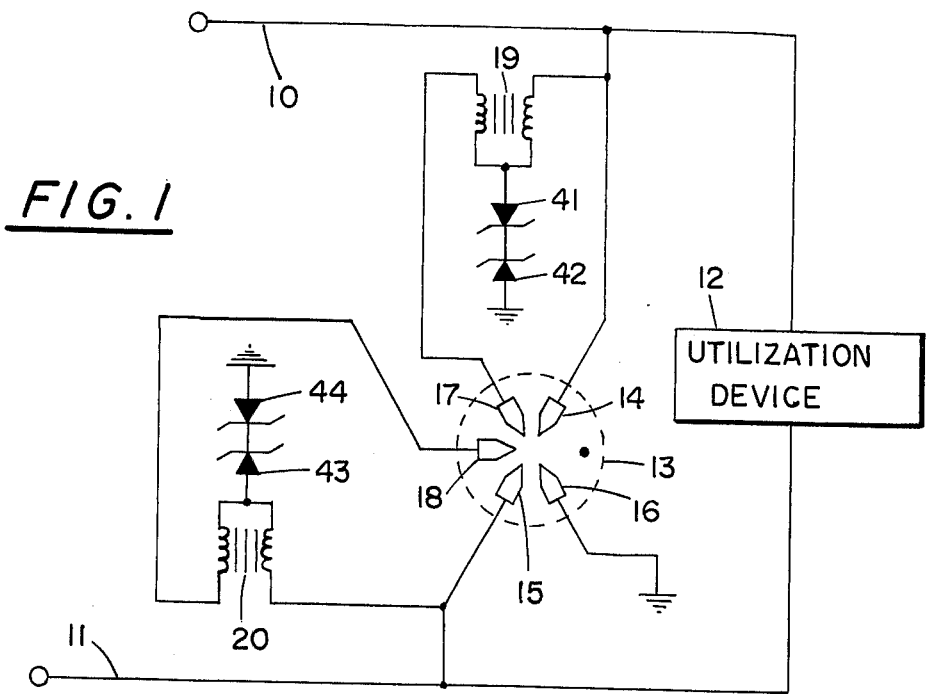
FIG. 1 illustrates a preferred embodiment of the invention.

Referring first to FIG. 1, a pair of signal lines 10 and 11 feed a utilization device 12. A five-electrode gas-filled discharge tube 13 is also connected across signal lines 10 and 11. One electrode 14 is connected directly to signal line 10; another electrode 15 is connected to line 11; and a third electrode 16 which may be the outer casing is connected to electrical ground. The tube 13 also contains a fourth electrode 17 which is associated with electrode 15. The primary winding of a transformer 19 is connected to electrode 14 and the secondary winding is connected to electrode 17. The primary winding of another transformer 20 is connected to electrode 15 and its secondary is connected to electrode 18. Each transformer has a step-up turns ratio to produce an amplified signal between its associated electrodes when a signal appears at the respective electrodes 14 and 15 which are directly connected respectively to lines 10 and 11. The primary and secondary of transformer 19 are joined together at one end and that junction is at a reference potential level which is provided by a pair of back-to-back zener diodes 41 and 42 connected to ground. The junction of one end of the primary and secondary of transformer 20 is also at a reference potential level provided by zener diodes 43 and 44 connected back-to-back to ground. The reference potential level at the junction of the primary and secondary of transformers 19 and 20 can be provided in other ways but the illustrated zener diode arrangement appears to be preferable. As will be described later in greater detail, the back-to-back arrangement of the zener diodes will operate to protect the signal lines 10 and 11 whether they are AC or DC signal lines and whether the surges are negative or positive going.

Under normal operating conditions, when the electrical signal on signal lines 10 or 11 is the usual or normal signal level, the signal is applied to and utilized by utilization device 12. When a voltage surge which substantially exceeds the normal signal magnitude appears on signal line 10, it is applied to electrode 14. Without transformer 19 in the electrical circuit, the surge would have to be a magnitude at least equal to the firing potential of the gas tube 13; otherwise, the surge will be transmitted down signal line 10 to the utilization device 12. As stated earlier, in the ordinary case the firing potential of gas tube 13 is at least 200 volts and usually is 300 to 500 volts. In the arrangement illustrated in FIG. 1, if the surge appearing on signal line 10 is sufficient to cause conduction through zener diodes 41 and 42 and through the primary of transformer 19, the surge is also applied to electrode 17 through the step-up transformer 19. If the magnitude of the potential appllied in this fashion to electrode 17 is equal to or exceeds the igniting potential of the gas tube 13, the gas tube will fire to bring the signal line 10 down to a level which is the potential drop across the connecting tube. The turns ratio of transformer 19 and the reference potential level are selected such that the signal on line 10 can exceed the normal signal by a predetermined amount, for example, up to a level that will not harm the utilization device 12, and not fire the gas tube 13 but when the signal exceeds or nears a level which may be harmful, then the zener diode combination 41 and 42 will conduct and the potential at electrode 17 will be sufficient to ignite the gas tube 13. For example, assume that gas tube 13 has an igniting potential in the order of about 500 volts and that the normal signal level on signal line 10 is in the order of about five volts DC and that the utilization device is to be protected against any surge in excess of 5 volts, that is, if the potential on the signal line 10 should exceed a 10 volt level. Zener diodes 41 and 42 are selected to provide a reference potential of say about eight volts, that is, there will be no conduction through the zener diodes 41 and 42 until the potential applied across them is in the order of about 8 volts. If a surge of about 5 volts appears on signal line 10 so that signal line 10 momentarily is at a potential level of about 10 volts, this is instantaneously applied across the zener diodes 41 and 42 causing them to conduct and causing conduction through the primary of transformer 19. A pulse of about 2 volts magnitude will appear across the primary of transformer 19. In this instance, the primary to secondary turns ratio would have been selected to be about 250 to 1 so that a 2 volt pulse on the primary would produce a 500 volt pulse on the secondary of transformer 19 and be applied to electrode 17 causing tube 13 to ignite thereby putting electrode 14 at a potential level equal to the tube drop. A lower reference voltage level could be selected and, correspondingly, a lower turns ratio would then be acceptable. For example, if the reference level were selected to be about 6 volts, then a 5 volt surge on line 10 would result in about a 4 bolt pulse on the primary of transformer 19. In that event, the turns ratio would only have to be 125 to 1 to produce a voltage of about 500 volts on the secondary of transformer 19 to be applied to electrode 17. In this latter example, although the zener diodes 41 and 42 would conduct with a surge greater than 1 volt, the resulting voltage on the secondary of transformer 19 would not be enough to fire tube 13 until the 5 volt surge level was reached.

In the event of a large enough surge on line 11, gas tube 13 will fire in the same manner through the operation of transformer 20 connected between electrodes 15 and 18 and the zener diodes 43 and 44. So in a two-line transmission system, for example, a two wire telephone line system, a five electrode gas-filled discharge tube in combination with a pair of step-up transformers and suitable voltage reference levels, as illustrated in FIG. 1, when a line surge occurs will ground both lines virtually simultaneously because either line igniting the gas tube 13 will provide a low impedance path for both lines to grounded electrode 16.

Figure 2:
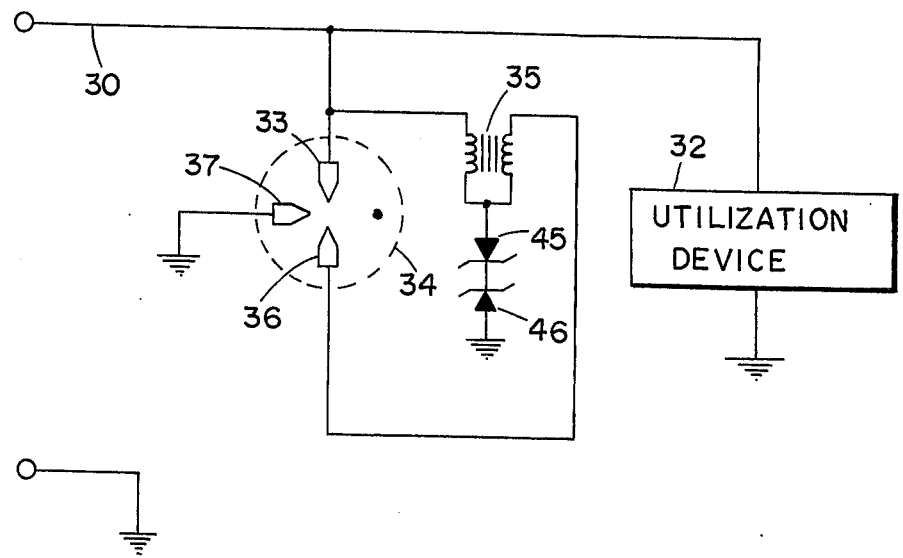
FIG. 2 illustrates a second embodiment of the invention.

FIG. 2 illustrates a single signal line or a double line where one line is grounded. Signal line 30 feeds utilization device 32. Electrode 33 in gas-filled discharge tube 34 is connected to signal line 30 and through transformer 35 to electrode 36, and the junction of the primary and secondary of transformer 35 is connected through a pair of back-to-back zener diodes 45 and 46 to ground to provide a reference potential level similar to that described in FIG. 1. Electrode 37 is connected to electrical ground. The step-up transformer 35 is similar to transformers 19 and 20 in FIG. 1 and the circuit of FIG. 2 operates similar to that of either half of the circuit of FIG. 1. In this fashion a siganl of sufficient magnitude appearing on signal line 30 will cause the gas tube 34 to fire thereby clamping signal line 30 through electrodes 33 and 37 at a potential level equal to the tube drop. A signal of lower magnitude will not cause the tube to fire.

We claim:

1. For a lightning protector for a pair of electrical signal lines coupled to a utilization device, in combination: a gas-filled discharge tube having five electrodes, one of said electrodes adapted for electrical connection to one of said signal lines, another of said electrodes adapted for electrical connection to the other of said signal lines, and a third electrode being electrically grounded; a first step-up transformer having one end of its primary connected to said one electrode and one end of its secondary connected to a fourth electrode and the other end of its secondary and primary connected only to a reference potential level; and another step-up transformer having one end of its primary connected to said another electrode and one end of its secondary connected to a fifth electrode and the other end of its primary and secondary connected only to a reference potential level other than electrical ground.

2. The invention as set forth in claim 1 wherein said reference potential level comprises zener diode means having a grounded electrode.

3. The invention as set forth in claim 2 wherein said zener diode means comprises a pair of back-to-back zener diodes with one electrode of one of the diodes grounded and the other electrode of the other diode connected to said other end of the transformer primary and secondary.

4. The invention as in claim 1 wherein the gas discharge tube has an ignition potential value substantially greater than the amplitude of the normal signals on said signal lines; and the turns ratio of said transformers and the reference potential levels are such that the potential appearing on said fourth electrode and on said fifth electrode through the respective transformers is less than the ignition potential when the normal signal appears on the signal lines but is at least equal to the ignition potential when the amplitude of a signal on either signal line is greater than that of the normal signal to a degree sufficient to be damaging to the utilization device.

5. For a lightning protector for an electrical signal line coupled to a utilization device: a gas-filled discharge tube having at least three electrodes, one of said electrodes adapted for electrical connection to the signal line; another of said electrodes electrically grounded; and a transformer having a step-up turns ratio with one end of the primary of said transformer connected to said one electrode and one end of the secondary of said transformer connected to a third ungrounded electrode and the other end of the primary and secondary of said transformer connected only to a reference potential level other than electrical ground.

6. The invention as set forth in claim 5 wherein said reference potential level comprises zener diode means having a grounded electrode.

7. The invention as set forth in claim 6 wherein said zener diode means comprises a pair of back-to-back zener diodes with one electrode of one of the diodes grounded and the other electrode of the other diode connected to said other end of the transformer primary and seconary.

8. The invention as set forth in claim 5 wherein the gas discharge tube has an ignition potential value substantially greater than the amplitude of the normal signal on said signal line; and the turns ratio of said transformer and said reference potential level are such that the potential appearing at said third electrode through the transformer is less than the ignition potential when the normal signal appears on the signal line but is at least equal to the ignition potential when the amplitude of a signal on the signal line is a predetermined amount greater than the normal signal.

9. The invention as set forth in claim 8 wherein the ignition potential of said gas discharge tube is in the order of at least about 200 volts.

10. In a lightning protector for a pair of electrical signal lines coupled to a utilization device which includes a gas-filled three-electrode discharge tube with one electrode electrically grounded and each of the other two electrodes connected to respective ones of said signal lines, the improvement comprising: another electrode in the gas tube for each electrode connected to a signal line; a step-up transformer coupled between each of said another electrodes and its associated line-connected electrode with one end of the primary of each transformer connected to the line connected electrode and one end of the secondary of each transformer coupled to one of said another electrodes and the other end of each primary and each secondary connected only to a reference potential level other than electrical, the turns ratio of said transformers and said reference potential levels being selected such that the potential appearing at the transformer-coupled electrodes is less than the gas ignition potential when a normal signal level is on the lines but reaches the gas ignition potential when a line signal reaches a predetermined level in excess of the normal signal level.

* * * * *